June 12, 1945.   R. E. LEARY   2,377,946
METHOD OF AND APPARATUS FOR SHAPING THERMOPLASTIC SHEETS
Filed Dec. 27, 1940    2 Sheets-Sheet 1
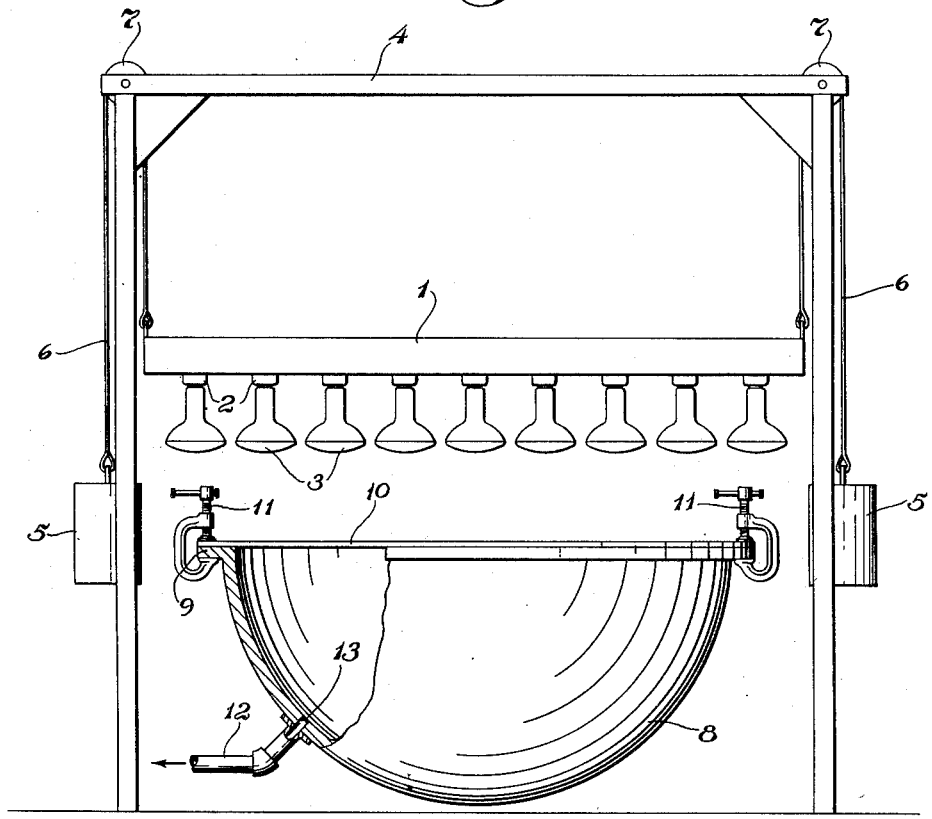
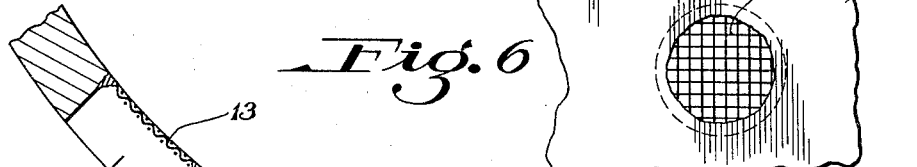
Richard E. Leary
INVENTOR
BY
ATTORNEY June 12, 1945.  R. E. LEARY  2,377,946
METHOD OF AND APPARATUS FOR SHAPING THERMOPLASTIC SHEETS
Filed Dec. 27, 1940  2 Sheets-Sheet 2

Richard E. Leary
INVENTOR

BY J. M. Casley Jr.
ATTORNEY

Patented June 12, 1945

2,377,946

UNITED STATES PATENT OFFICE 2,377,946

METHOD OF AND APPARATUS FOR SHAPING THERMOPLASTIC SHEETS

Richard E. Leary, Newark, N. J., assignor to E. I. du Pont de Nemours & Company, Wilmington, Del., a corporation of Delaware Application December 27, 1940, Serial No. 371,889

11 Claims. (Cl. 18—19)

This invention relates to a method of and apparatus for shaping thermoplastic sheets and, more particularly, to a method of and apparatus for forming from uniform thermoplastic sheets objects of substantially uniform thickness having three-dimensional curved surfaces.

The shaping of thermoplastic sheets has heretofore usually been accomplished by placing a thermoplastic sheet against the opening of a negative die, softening the sheet by applying heat substantially uniformly over the surface, and pressing it into the die either by the action of a positive die or by the application of fluid pressure. Alternatively, the sheet has been softened before being placed across the die opening.

In the forming operation, sheet material uniformly heated stretches more at the center of the die than at the periphery. This unequal stretching results in a product of non-uniform thickness. In the molding of relatively small objects or of objects in which the deformation is comparatively slight, this variation in thickness may be relatively unimportant. In the molding of large objects from sheet material, however, particularly where the degree of deformation is great, variations in the thickness of the object, due to said non-uniform stretching, are seriously objectionable, particularly where uniform strength, rigidity, or optical properties are desirable.

It is an object of this invention to provide a novel method and apparatus for shaping thermoplastic sheets. More particularly, it is an object to provide a method of and apparatus for the forming from uniform thermoplastic sheets of objects of substantially uniform thickness having three-dimensional curved surfaces. It is a further object to provide for the production of relatively large objects of uniform thickness from thermoplastic sheets. Other objects will be apparent from the description of the invention given hereinafter.

The above objects are accomplished in accordance with this invention by the non-uniform heating of a thermoplastic sheet and by the subsequent or simultaneous shaping of the sheet. The invention embraces the use of differential radiant heating in conjunction with vacuum forming for the shaping of thermoplastic sheets.

More specifically, the invention comprises a method and an apparatus whereby a sheet of thermoplastic substance is clamped across the opening of a negative die, subjected to non-uniform infra-red radiation, thereby to effect differential plasticity in the material, the condition of greatest plasticity being caused to occur in those regions of the sheet which, under conditions of uniform plasticity, would normally be expected to stretch least, and caused to assume the conformation of the die by the withdrawal of air from the die.

The source of infra-red radiation is conveniently a bank of infra-red heating lamps arranged in that manner, which, as determined by previous experiment, will result in a product of non-varying caliper. In general, the arrangement is such that the greatest heating will occur in those areas of the sheet most closely adjacent to the edge of the mold, since, under conditions of uniform heating, said areas customarily undergo the least stretching.

In order that the invention may be more fully understood, reference is made to the accompanying drawings in which:

Fig. 1 is a front elevation, more or less diagrammatic, of one embodiment of the apparatus of the present invention with part of the negative die broken away for purposes of illustration;

Fig. 5 is an enlarged sectional fragmentary view of the negative die at the place of connection to the vacuum line, and Fig. 6 is a plan view of that part of the negative die shown in Fig. 5, looking in the direction of the arrow in Fig. 5.

Figure 2:
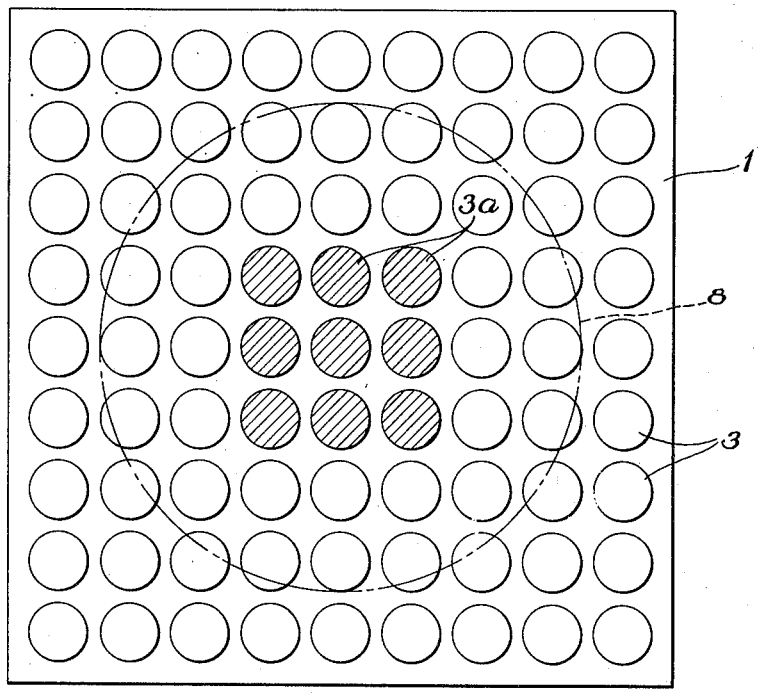
Fig. 2 is a diagrammatic plan view of the bank of infra-red heating lamps of Fig. 1, showing the relative position of the negative die.

Referring particularly to Fig. 1, reference numeral 1 denotes a rectangular platform support equipped with a plurality of light sockets 2 into which are screwed infra-red heating lamps 3. The sockets 2 are electrically wired and the wiring (not shown) may be so arranged that the lamps 3 may be energized individually by switch control or, if desired, may be energized in small groups. Alternatively, individual control of the energizing of the lamps 3 may be effected simply by screwing or partly unscrewing them in their sockets 2, thus simplifying the construction of the apparatus.

The specific means of individually controlling the energizing of each heating lamp, or each small group of heating lamps considered as a unit, is not material to the present invention but it is essential that some means be provided for controlling the energizing of the lamps either individually or in a plurality of units of small groups of the lamps.

The support 1 is mounted for vertical adjustment within the frame 4 by means of counterbalancing weights 5 connected to the support 1 by ropes or wires 6 passing over pulleys 7 rotatably mounted in the frame 4.

The negative die 8 is disposed, with its cavity opening upward, beneath the support 1. The particular die illustrated is hemispherical in shape and is provided with the flange 9. As shown in Fig. 1, a thermoplastic sheet 10 is securely held across the opening of the die by a plurality of clamps 11 (only two of which are illustrated), which clamps 11 are tightened down on the edge of the sheet 10 and on the flange 9 of the die 8. Other means of clamping the sheet 10 will be apparent, the specific means employed not being critical so long as the sheet 10 is held securely.

Communicating with the cavity of the die 8 is the vacuum line 12 which may be connected to any convenient source of vacuum such as a vacuum pump. As shown in detail in Figs. 5 and 6, the opening in the cavity of the die 8 for the vacuum line 12 is covered by a screen 13. This screen 13 is brazed into place substantially flush with the inner surface of the die 8 and, preferably, this screen is constructed of relatively fine wire and is of relatively fine mesh. For example, a screen of about 10 mesh and constructed of No. 6 gauge wire has been found satisfactory.

Molding according to the present invention is carried out in the above described apparatus by securing the thermoplastic sheet 10 in the position shown in Fig. 1 and adjusting the support 1 to bring the infra-red lamps 3 to the desired proximity to the sheet 10. Certain of the lamps 3 are then energized, the number and position of the energized lamps having been previously determined by experiment so as to effect differential plasticity in the sheet 10, the condition of greatest plasticity being caused to occur in the portion of sheet 10 adjacent of the rim of the die 8, which portion, under conditions of uniform plasticity, would stretch the least when the sheet 10 was caused to assume the conformation of the die. In Fig. 2, the arrangement of energized lamps 3 and unenergized lamps 3a (shaded in Fig. 2) with respect to the die (shown in phantom lines in Fig. 2) is illustrated for making a hemispherical shape.

It will be apparent from looking at Fig. 2 that the arrangement will result in the central portion of the sheet 10 being heated less than the peripheral portion. When the sheet 10 has been sufficiently heated and attained the desired degree of differential plasticity, air is withdrawn from the die through the vacuum line 12 whereby the sheet 10 is sucked into the die and caused to assume the conformation thereof. The resulting molded article is allowed to cool and is then removed from the die.

Figures 3, 4:
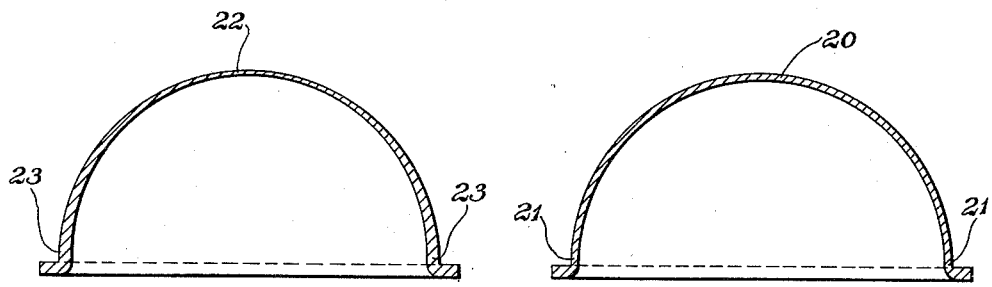
Fig. 3 is a section through an article made by the method of the prior art.
Fig. 4 is a corresponding section through an article made by the method of the present invention.

Molded articles produced by the method of the present invention have a substantially uniform caliper as indicated in the case of the molded article of Fig. 4. The center 20 of the article is substantially equal to the peripheral regions 21. In contrast, there results by the method of the prior art, a molded article such as shown in Fig. 3. This molded article is of non-uniform caliper as the peripheral regions 23 are appreciably thicker than the center 22. The cross-sections in Figs. 3 and 4 are purposely exaggerated somewhat to illustrate this.

While the present invention has been described above with respect to one specific embodiment thereof, it will be obvious that considerable variation may be made in both the apparatus and method without departing from the spirit of the invention. In place of the infra-red heating lamps there may be used any other controllable source of differential radiant energy. The negative die may be made of any material or construction which will permit partial evacuation and which will give an object of the desired quality and configuration.

Within the die may be placed certain cushioning or lubricating substances such as water or petroleum jelly, designed to prevent the assumption of irregularities or flaws in the inner surface of the die by the outer surface of the article being molded.

The opening in the die for the vacuum line may be placed anywhere desired. Because the surface of the molded article that contacted the screen covering the opening, will tend to reproduce that surface and, hence, result in a small area on the surface which might be considered an imperfection from the appearance standpoint although it has no effect on the structural strength of the article, it is practical to place the opening so that the imperfection, if so it be considered, will occur at a place on the molded article which is to be cut out, joined with some other element, or in other way covered up or eliminated. By placing the opening adjacent the flange 9 of the die 8, the mark caused by the screen is usually in the least conspicuous place on the molded article and often will be eliminated in trimming the article. Further, when using a cushioning substance in the die, particularly a liquid such as water, it is obviously an advantage to place the opening for the vacuum line as high as practical.

In some cases it is advantageous to facilitate securely holding the thermoplastic sheet across the opening of the die by the use of a rim conforming with the flange 9 and held by the clamps 11 down on the flange 9 with the thermoplastic sheet interposed.

Obviously the support 1 may be held in fixed position and the die 8 raised or lowered to adjust its proximity to the heating units, or the die 8 and support 1 both may be constructed in fixed proximity to one another. The present invention does not require that the support 1, the thermoplastic sheet 10 to be molded nor the die 8 be held in horizontal position although this will generally be found most convenient.

The differential heating of the thermoplastic sheet may be accomplished not only by energizing various radiant heating means in certain predetermined areas in a plane parallel to the plane of the sheet, but also by the placing of the various heating units in more than one plane at predetermined distances from the thermoplastic sheet, or by the use of radiant heating means located in a plane forming a dihedral angle with the plane of the sheet.

While the foregoing description has been concerned with the forming from uniform thermoplastic sheets of three-dimensional articles of substantially uniform thickness, it is also within the scope of the present invention to produce from uniform thermoplastic sheets articles of a desired predetermined non-uniform thickness. Further, by the method and apparatus of this invention there may be formed from thermoplastic sheets of varying caliper articles of uniform or of predetermined non-uniform caliper.

It will be apparent that the present invention is broadly applicable to the shaping or molding of thermoplastic sheets generally. The present invention has been found particularly advantageous in the shaping of cellulose acetate sheets and sheets of polymerized methyl methacrylate but is adapted for shaping sheets of various cellulose derivatives and various polymerized substances so long as they are thermoplastic.

The present invention provides a readily constructed apparatus and an economical and practical method of molding thermoplastic sheets and is of particular merit in the molding of such sheets into relatively large articles.

As many apparently widely different embodiments of this invention may be made without departing from the spirit and scope thereof, it is to be understood that the invention is not limited to the specific embodiments thereof except as defined in the appended claims.

I claim:

1. Apparatus for shaping thermoplastic sheets comprising a negative die, means for holding a thermoplastic sheet across the opening of said die, means for withdrawing air from the cavity of said die, a plurality of units for supplying radiant heat positioned adjacent the opening of said die, and means for individually energizing said units to provide radiant heat.

2. Apparatus for shaping thermoplastic sheets comprising a negative die, means for holding a thermoplastic sheet across the opening of said die, means for withdrawing air from the cavity of said die, a plurality of infra-red heating lamps positioned adjacent the opening of said die, and means for individually energizing said heating lamps.

3. Apparatus for shaping thermoplastic sheets comprising a negative die horizontally disposed with its opening upward, means for holding a thermoplastic sheet across the opening of said die, means for withdrawing air from the cavity of said die, a plurality of units for supplying radiant heat positioned adjacent and over said die, and means for individually energizing said units to provide radiant heat.

4. Apparatus for shaping thermoplastic sheets comprising a negative die horizontally disposed with its opening upward, means for holding a thermoplastic sheet across the opening of said die, means for withdrawing air from the cavity of said die, a plurality of infra-red heating lamps positioned adjacent and over said die, and means for individually energizing said heating lamps.

5. Apparatus for shaping thermoplastic sheets comprising a negative die horizontally disposed with its opening upward, means for holding a thermoplastic sheet across the opening of said die, means for withdrawing air from the cavity of said die, a bank of units for supplying radiant heat positioned in horizontal plane over said die, and means for individually energizing said units to provide radiant heat.

6. Apparatus for shaping thermoplastic sheets comprising a negative die horizontally disposed with its opening upward, means for holding a thermoplastic sheet across the opening of said die, means for withdrawing air from the cavity of said die, a bank of infra-red heating lamps positioned in horizontal plane over said die, and means for individually energizing said heating lamps.

7. Apparatus for shaping thermoplastic sheets comprising a negative die horizontally disposed with its opening upward, clamping means for holding a thermoplastic sheet across the opening of said die, means for withdrawing air from the cavity of said die, a vertically adjustable bank of units for supplying radiant heat positioned in horizontal plane over said die, and means for individually energizing said units to provide radiant heat.

8. Apparatus for shaping thermoplastic sheets comprising a negative die horizontally disposed with its opening upward, clamping means for holding a thermoplastic sheet across the opening of said die, means for withdrawing air from the cavity of said die, a bank of infra-red heating lamps positioned in horizontal plane over said die, and means for individually energizing said heating lamps.

9. Process of shaping a thermoplastic sheet which comprises placing said sheet across the opening of a negative die, subjecting said sheet to non-uniform radiant heat to effect differential plasticity in said sheet, said non-uniform radiant heat being so regulated that the condition of greatest plasticity of said sheet is effected in those regions thereof which, under conditions of uniform plasticity, would stretch the least upon said sheet being forced to assume the conformation of said die, and withdrawing air from said die whereby said sheet is made to assume the conformation of said die.

10. Apparatus for shaping thermoplastic sheets into substantially hemispherical turrets having walls of substantially uniform thickness, for airplanes and the like, comprising a negative die, means for holding a thermoplastic sheet across the opening of said die, means for withdrawing air from the cavity of said die, a plurality of units for supplying radiant heat positioned adjacent the opening of said die, and means for individually energizing said units to provide radiant heat.

11. Process of shaping a thermoplastic sheet into a substantially hemispherical turret having walls of substantially uniform thickness, for airplanes and the like, comprising placing said sheet across the opening of a negative die, subjecting said sheet to non-uniform radiant heat to effect differential plasticity in said sheet, said non-uniform radiant heat being so regulated that the condition of greatest plasticity of said sheet is effected in those regions thereof which, under conditions of uniform plasticity, would stretch the least upon said sheet being forced to assume the conformation of said die, and withdrawing air from said die whereby said sheet is made to assume the conformation of said die.

RICHARD E. LEARY.